(No Model.) 2 Sheets—Sheet 1.
J. C. JOHNSTON.
COTTON PICKING MACHINE.
No. 358,273. Patented Feb. 22, 1887.
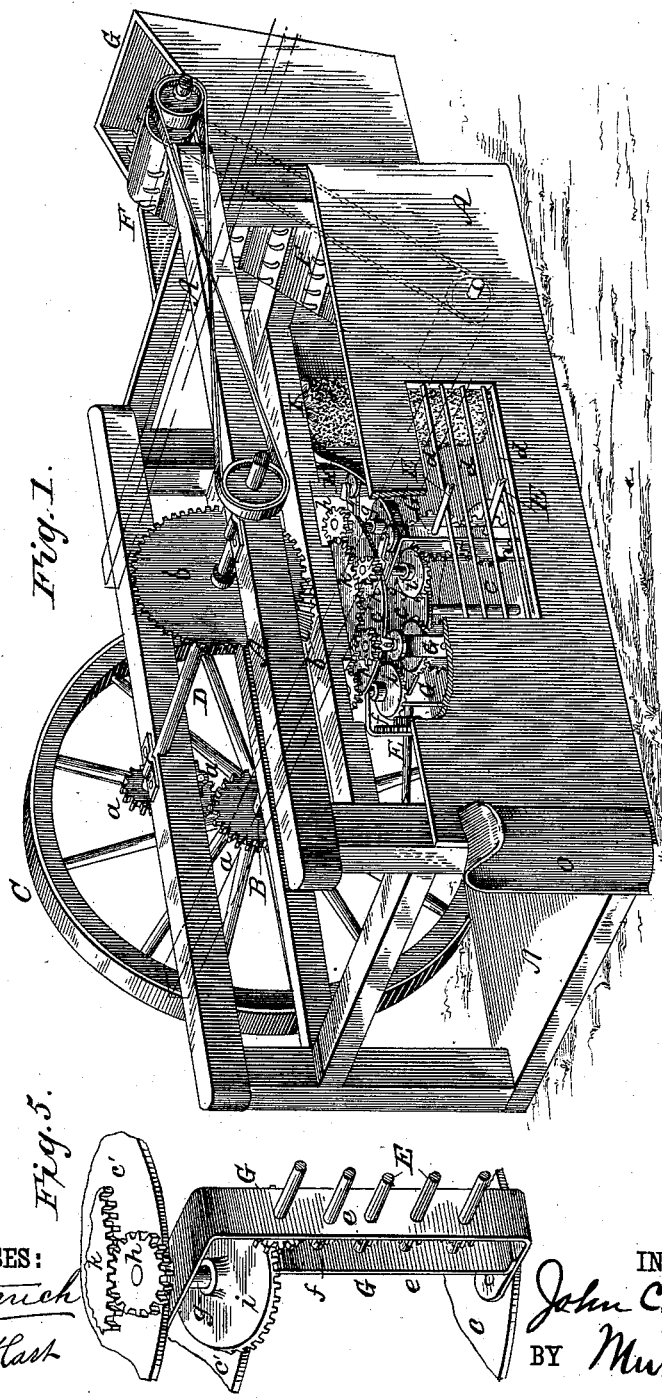

(No Model.) 2 Sheets—Sheet 2.
J. C. JOHNSTON.
COTTON PICKING MACHINE.
No. 358,273. Patented Feb. 22, 1887.
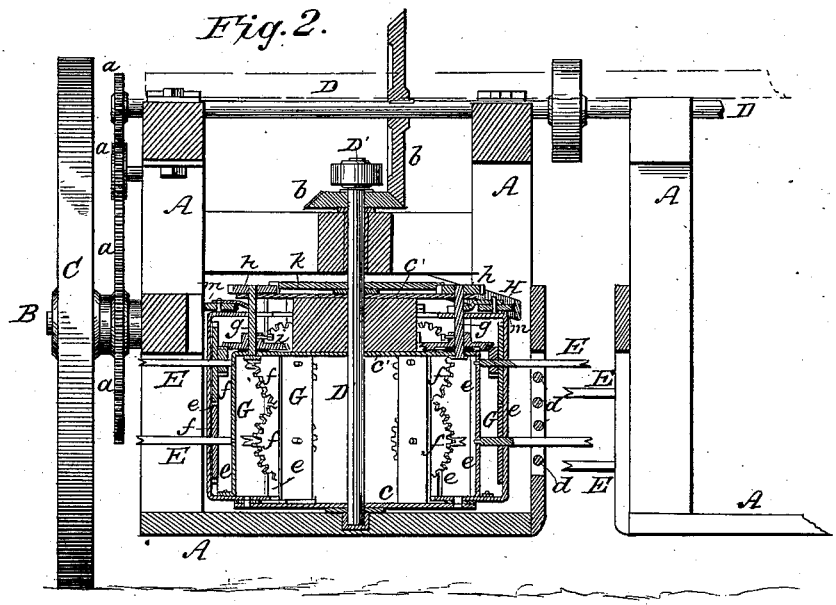
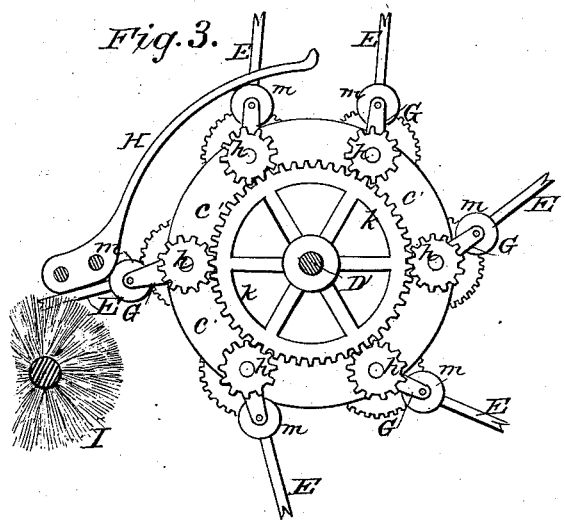
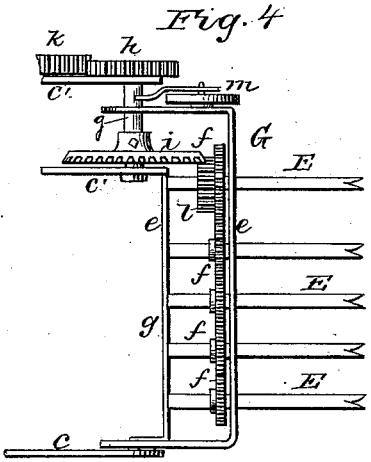
WITNESSES:
Fred G. Dietrich
Amos W. Hart
INVENTOR:
John C. Johnston
BY Munn & Co.
ATTORNEYS.
N. PETERS, Photo-Lithographer, Washington, D. C.

UNITED STATES PATENT OFFICE.

JOHN CLARK JOHNSTON, OF DOUGLASVILLE, GEORGIA.

COTTON-PICKING MACHINE.

SPECIFICATION forming part of Letters Patent No. 358,273, dated February 22, 1887.

Application filed November 17, 1885. Serial No. 183,131. (No model.)

*To all whom it may concern:*

Be it known that I, JOHN CLARK JOHNSTON, a citizen of the United States, residing at Douglasville, in the county of Douglas and State of Georgia, have invented a new and useful Improvement in Cotton-Picking Machines, of which the following is a description.

My invention is an improvement in the class of cotton-picking machines in which a series of revolving barbed rods or fingers are employed to remove the cotton from the bolls.

In my machine the box or frame is in two parts, between which the row of cotton-plants passes. Barbed fingers that rotate rapidly are projected horizontally into the plants from each side and extract the cotton, which is then stripped off and delivered into a suitable receptacle. The mechanism for operating these fingers constitutes the chief feature of my invention.

In the accompanying drawings, Figure 1 is a perspective view of one side or half of the machine. Fig. 2 is mainly a vertical cross-section. Fig. 3 is a plan view of the picking mechanism proper. Fig. 4 is a side view of a portion of the picking mechanism detached. Fig. 5 is a perspective view of the same.

The frame or box of the machine is constructed in two parts or longitudinal portions, A A, which are separated by a space of sufficient width to permit the passage of a row of full-grown cotton plants or bushes between them. This double box A A is supported by the short axles B of two supporting-wheels, C C. A shaft, D, extends across the top of frame A A, and derives motion from the wheels C by means of gearing $a$, as shown in Figs. 1 and 2. From this cross-shaft D motion is imparted to the picking mechanism proper by means of bevel-gears $b$. The vertical shaft D' carries said mechanism. I will now describe the latter and its operation in detail.

The mechanism shown is in practice duplicated, one being on each side of the machine, so as to operate on both sides of the cotton row; but the drawings show it on one side only. The inner side of each box A has an opening, across which a series of parallel bars, $d$, extend horizontally. Through these openings, and between the bars, the horizontal fingers or rods E project, for the purpose of extracting the cotton from the bolls, and to enable them to do this successfully their outer ends are provided with points or barbs, as shown. There are in practice, preferably, fifteen fingers, arranged in a vertical row and journaled in a movable vertical frame, G, of which there are preferably ten, so that each picking mechanism includes one hundred and fifty fingers or picking devices proper. These frames G are composed of parallel vertical bars or plates $e$, and the fingers E pass through and have bearings in both. Gears $f$ are fixed on the fingers between the bars $e$ and mesh with each other, as shown, so that all the fingers E will revolve together. The frames G are pivoted at their lower ends to the disk $c$, mounted on the shaft D', and at their upper ends on a short vertical shaft, $g$, that has its bearings in the edges of the two adjacent disks $c'$ $c'$. Said shaft carries a small gear, $h$, and crown or bevel gear $i$. The former, $h$, meshes with a large horizontal gear, $k$, that is fixed in the frame of the machine, and the gear $i$ meshes with a pinion, $l$, on the upper one of the row of fingers E.

It will be apparent, as the result of the above-described construction and arrangement of parts, that as the machine is drawn along over a cotton row the fingers E will have the following movements: First, they rotate with the shaft D', since the disks $c$ $c$ $c'$ and frames G are necessarily carried around with it; second, they rotate on their own axes in consequence of the coaction of the gears and pinions before described. The fingers also have a third independent movement, due to the horizontal oscillation of the frames G relative to the disks and shaft that carry them.

Owing to the friction of the revolving parts, the frames G are normally thrown in the direction of rotation, and hence the fingers E project between the bars $d$ at right angles to the direction of motion of the machine, and, owing to the drag of the cotton fiber in leaving the bolls, the fingers maintain this position until drawn back by further rotation of shaft D'. During a part of this time the fingers are, however, revolved at higher speed than in the other portion of their circuit, so as to operate more effectively in taking up the cotton. To cause such differentiated rotation I employ a friction-wheel, $m$, which is mounted on the upper end of each frame G, and a curved rail, H, Fig. 3, that extends horizontally around the upper disk, c', for about one-fourth of its circumference, and is placed in such relation to said wheel m that the latter runs in contact with its inner side.

It will be seen that when the wheel m strikes the free end of such rail H the frame G and its fingers E will be thrown back and will be held back, as shown in Fig. 3. The speed of rotation of the fingers is thereby increased—that is to say, as each frame G swings backward the series of pinions f is rotated faster by reason of the upper one of the series running back on the gear i, while the latter rotates forward at a constant speed. When the wheel m of each frame G leaves the rail, the revolving brush I acts on the finger ends and removes the adhering cotton, which is delivered into a receptacle, Fig. 1, suitably arranged for the purpose. The said brush is arranged vertical and fixed on a shaft journaled at the rear end of the rail H. It derives rotary motion from the axle through the medium of gearing. (Not shown.)

The bars d remove most of the leaves and limbs of the plants that may adhere to the cotton extracted by the fingers E.

It is intended that the movement of the frames G and their fingers E shall be regulated to accord with the forward movement of the machine, so that while the fingers are projected between the bars d they shall move rearward with the plants and at the same rate. To assist in gathering and crowding the latter into the central space between the boxes A, I affix outwardly-turned guides o to the front end of the latter. (See Fig. 1.)

The cotton removed by brush I from the fingers E is conveyed by a toothed belt, F, Fig. 1, into a receptacle, G, at the rear of the machine.

What I claim is—

1. In a cotton-picker, the combination, with the rotary shaft D', the gear k, fixed in the frame, and hence not rotating with the shaft, the short shafts g and pinions fixed thereon, the disks or supports for the latter, vertical frames G, pivoted to said disks and swinging around the shafts g, and a series of rotary barbed fingers journaled in said frames, as shown and described.

2. In a cotton-picking machine, the combination of the following elements: the rotating frame c c', the pivoted swinging vertical frames G, the series of rotary fingers journaled in said frames, and a series of meshing-pinions, f, attached to the fingers, the gear i, operating said pinions, means for rotating said gear, and a rail, H, with which said frames come in contact when sweeping around the circuit, all as shown and described, whereby the fingers are not only thrown back, but their rapidity of rotation increased, as specified.

JOHN CLARK JOHNSTON.

Witnesses:
THOMAS R. WHIRTLEY,
JOHN R. BRANTLEY.